(12) United States Patent
Neuhaus

(10) Patent No.: US 8,453,875 B2
(45) Date of Patent: Jun. 4, 2013

(54) DISPENSING DEVICE

(75) Inventor: Reinhard Neuhaus, Hemer (DE)

(73) Assignee: Aptar Dortmund GmbH, Dortmund (DE)

( * ) Notice: Subject to any disclaimer, the term of this patent is extended or adjusted under 35 U.S.C. 154(b) by 789 days.

(21) Appl. No.: 12/486,855

(22) Filed: Jun. 18, 2009

(65) Prior Publication Data

US 2009/0314810 A1    Dec. 24, 2009

(30) Foreign Application Priority Data

Jun. 20, 2008   (DE) .................. 10 2008 029 006

(51) Int. Cl.
*G01F 11/00* (2006.01)

(52) U.S. Cl.
USPC .......... 222/1; 222/380; 222/402.13; 222/494; 29/527.2

(58) Field of Classification Search
USPC .................. 222/1, 402.13, 402.1, 380, 321.7, 222/494; 29/527.2; 264/241
See application file for complete search history.

(56) References Cited

U.S. PATENT DOCUMENTS

| | | | |
|---|---|---|---|
| 1,881,488 A | 10/1932 | Gleason |
| 2,500,687 A | 3/1950 | Kamp et al. |
| 2,714,475 A | 8/1955 | Roehrich |
| 2,721,010 A | 10/1955 | Meshberg |
| 2,736,930 A | 3/1956 | Longley |
| 2,772,819 A | 12/1956 | Poarch et al. |
| 2,812,884 A | 11/1957 | Ward |
| 2,837,249 A | 6/1958 | Meshberg |
| 2,884,164 A | 4/1959 | Kleid |
| 2,980,301 A | 4/1961 | Gorter |
| 3,018,928 A | 1/1962 | Meshberg |
| 3,073,489 A | 1/1963 | Friedman |
| 3,104,785 A | 9/1963 | Beard, Jr. |
| 3,131,834 A | 5/1964 | Meshberg |
| 3,154,224 A | 10/1964 | Wakeman |
| 3,155,291 A | 11/1964 | Wakeman |
| 3,162,333 A | 12/1964 | Davidson |
| 3,258,369 A | 6/1966 | Blaich |
| 3,286,885 A | 11/1966 | Huling |
| 3,323,695 A | 6/1967 | Monahon |
| 3,385,482 A | 5/1968 | Frangos |
| 3,507,586 A | 4/1970 | Gronemeyer et al. |
| 3,511,418 A | 5/1970 | Venus, Jr. |

(Continued)

FOREIGN PATENT DOCUMENTS

| DE | 2043415 | 9/1970 |
| DE | 2920497 | 11/1980 |

(Continued)

OTHER PUBLICATIONS

U.S. Appl. No. 12/303,807, filed Apr. 1, 2010, Neuhaus et al.

(Continued)

*Primary Examiner* — Frederick C. Nicolas

(74) *Attorney, Agent, or Firm* — Jason H. Vick; Sheridan Ross, PC

(57) ABSTRACT

What is being proposed is a dispensing device for a preferably cosmetic liquid and a manufacturing method. A first material is pretreated in areas through the application of a coating or embossing foil such that a second material which is injection-molded directly against it does not bond with the first material in the pretreated area but rather can be detached again.

20 Claims, 8 Drawing Sheets

U.S. PATENT DOCUMENTS

| | | |
|---|---|---|
| 3,542,253 A | 11/1970 | Weber et al. |
| 3,608,830 A | 9/1971 | Ramella |
| 3,642,179 A | 2/1972 | Micallef |
| 3,672,543 A | 6/1972 | Roper et al. |
| 3,698,961 A | 10/1972 | Niemann |
| 3,705,667 A | 12/1972 | Blanie et al. |
| 3,706,393 A | 12/1972 | Curtis et al. |
| 3,726,442 A | 4/1973 | Davidson et al. |
| 3,795,350 A | 3/1974 | Shay |
| 3,796,356 A | 3/1974 | Venus, Jr. |
| 3,931,831 A | 1/1976 | French |
| 3,961,725 A | 6/1976 | Clark |
| 3,337,096 A | 8/1976 | Brown |
| 3,991,916 A | 11/1976 | Del Bon |
| 4,035,303 A | 7/1977 | Ufferfilge |
| 4,099,651 A | 7/1978 | Von Winckelmann |
| 4,222,501 A | 9/1980 | Hammett et al. |
| 4,304,749 A | 12/1981 | Bauer |
| 4,352,443 A | 10/1982 | Libit |
| 4,387,833 A | 6/1983 | Venus, Jr. |
| 4,393,984 A | 7/1983 | Debard |
| 4,416,602 A | 11/1983 | Neumeister |
| 4,423,829 A | 1/1984 | Katz |
| 4,458,832 A | 7/1984 | Corsette |
| 4,493,444 A | 1/1985 | Del Bon et al. |
| 4,506,808 A | 3/1985 | Goncalves |
| 4,513,890 A | 4/1985 | Goncalves |
| 4,564,130 A | 1/1986 | Eulenburg |
| 4,830,229 A | 5/1989 | Ball |
| 4,867,347 A | 9/1989 | Wass et al. |
| 4,875,604 A | 10/1989 | Czech |
| 4,892,231 A | 1/1990 | Ball |
| 4,919,312 A | 4/1990 | Beard et al. |
| 4,946,076 A | 8/1990 | Hackmann et al. |
| 4,964,852 A * | 10/1990 | Dunning et al. ............... 604/75 |
| 4,969,577 A | 11/1990 | Werding |
| 5,007,556 A | 4/1991 | Lover |
| 5,007,596 A | 4/1991 | Iwahashi |
| 5,096,098 A | 3/1992 | Garcia |
| 5,139,201 A | 8/1992 | De Laforcade |
| 5,197,637 A | 3/1993 | Naumann |
| 5,221,724 A | 6/1993 | Li et al. |
| 5,244,128 A | 9/1993 | De Laforcade |
| 5,271,432 A | 12/1993 | Gueret |
| 5,273,191 A | 12/1993 | Meshberg |
| 5,301,850 A | 4/1994 | Gueret |
| 5,305,930 A | 4/1994 | De Laforcade |
| 5,340,031 A | 8/1994 | Neuhaus et al. |
| 5,360,145 A | 11/1994 | Gueret |
| 5,413,250 A | 5/1995 | Gueret |
| 5,454,488 A | 10/1995 | Geier |
| 5,465,872 A * | 11/1995 | Gueret ............................ 222/95 |
| 5,492,252 A | 2/1996 | Gueret |
| 5,505,341 A | 4/1996 | Gueret |
| 5,509,582 A | 4/1996 | Robbins, III |
| 5,588,565 A | 12/1996 | Miller |
| 5,622,284 A | 4/1997 | Sawicki |
| 5,649,645 A | 7/1997 | Demarest et al. |
| 5,687,884 A | 11/1997 | Bodin et al. |
| 5,728,333 A | 3/1998 | Tabata et al. |
| 5,732,855 A | 3/1998 | Van der Heijden |
| 5,743,441 A | 4/1998 | Baudin et al. |
| 5,769,283 A | 6/1998 | Owada et al. |
| 5,857,224 A | 1/1999 | Oberg et al. |
| 5,862,955 A | 1/1999 | Albini et al. |
| 5,868,287 A | 2/1999 | Kurokawa et al. |
| 5,873,491 A | 2/1999 | Garcia et al. |
| 5,875,936 A | 3/1999 | Turbett et al. |
| 5,875,939 A | 3/1999 | Geier |
| 5,881,929 A | 3/1999 | Coerver, Jr. |
| 5,927,568 A | 7/1999 | De Nervo et al. |
| 5,975,381 A | 11/1999 | Revenu |
| 6,007,914 A | 12/1999 | Joseph et al. |
| 6,083,450 A | 7/2000 | Safian |
| 6,112,953 A | 9/2000 | Gueret |
| 6,116,475 A | 9/2000 | Delage |
| 6,126,044 A | 10/2000 | Smith |
| 6,145,707 A * | 11/2000 | Baudin .................... 222/189.09 |
| 6,216,916 B1 | 4/2001 | Maddox et al. |
| 6,227,417 B1 | 5/2001 | De LaForcade et al. |
| 6,234,363 B1 | 5/2001 | Stradella |
| 6,298,960 B1 | 10/2001 | Derr |
| 6,322,542 B1 | 11/2001 | Nilson et al. |
| 6,328,920 B1 | 12/2001 | Uchiyama et al. |
| 6,352,184 B1 | 3/2002 | Stern et al. |
| 6,405,898 B1 | 6/2002 | O'Connor et al. |
| 6,589,216 B1 * | 7/2003 | Abbott et al. ................. 604/279 |
| 6,622,893 B2 * | 9/2003 | Leone et al. ............... 222/402.2 |
| 6,629,799 B2 | 10/2003 | Flores, Jr. |
| 6,756,004 B2 | 6/2004 | Davis et al. |
| 6,778,089 B2 | 8/2004 | Yoakum |
| 6,832,704 B2 | 12/2004 | Smith |
| 6,919,114 B1 | 7/2005 | Darras et al. |
| 6,966,465 B2 | 11/2005 | Kang |
| 7,264,142 B2 | 9/2007 | Py |
| 7,637,399 B2 | 12/2009 | Marroncles et al. |
| 7,748,647 B2 | 7/2010 | Clerget et al. |
| 7,780,045 B2 | 8/2010 | Rossignol |
| 7,854,355 B2 | 12/2010 | Rossignol |
| 7,934,667 B2 | 5/2011 | Westrich |
| 2002/0037179 A1 | 3/2002 | Suzuki et al. |
| 2002/0051314 A1 | 5/2002 | Hayashi |
| 2002/0074355 A1 | 6/2002 | Lewis et al. |
| 2002/0190085 A1 | 12/2002 | Stanford |
| 2003/0071080 A1 | 4/2003 | Yquel |
| 2003/0071085 A1 * | 4/2003 | Lasserre et al. ............... 222/521 |
| 2003/0230603 A1 | 12/2003 | Smith |
| 2005/0115984 A1 | 6/2005 | Pritchett et al. |
| 2005/0155980 A1 | 7/2005 | Neuhalfen |
| 2006/0060618 A1 | 3/2006 | Hoepner et al. |
| 2006/0186139 A1 | 8/2006 | Laidler et al. |
| 2006/0231519 A1 | 10/2006 | Py et al. |
| 2007/0228082 A1 | 10/2007 | Jasper et al. |
| 2007/0272767 A1 | 11/2007 | Niggemann |
| 2008/0099514 A1 | 5/2008 | Carter et al. |
| 2008/0110941 A1 | 5/2008 | Foster et al. |
| 2008/0197152 A1 | 8/2008 | Neuhaus et al. |
| 2009/0166383 A1 | 7/2009 | Canfield |
| 2009/0212075 A1 | 8/2009 | Neuhaus et al. |
| 2009/0294480 A1 | 12/2009 | Canfield |
| 2010/0012680 A1 | 1/2010 | Canfield et al. |
| 2010/0038385 A1 | 2/2010 | Jasper |
| 2010/0108722 A1 | 5/2010 | Canfield et al. |
| 2010/0147898 A1 | 6/2010 | Blumenstein et al. |
| 2010/0200616 A1 | 8/2010 | Decottignies |
| 2011/0309112 A1 | 12/2011 | Jordan |
| 2012/0111898 A1 | 5/2012 | Neuhaus |

FOREIGN PATENT DOCUMENTS

| | | |
|---|---|---|
| DE | 9307083 | 7/1993 |
| DE | 4210225 | 9/1993 |
| DE | 19851659 | 11/1998 |
| DE | 29820894 | 1/1999 |
| DE | 19744510 | 4/1999 |
| DE | 19832824 | 2/2000 |
| DE | 19950512 | 5/2001 |
| DE | 20203841 | 6/2002 |
| DE | 10308727 | 6/2004 |
| DE | 202004011219 | 11/2004 |
| DE | 202004011220 | 11/2004 |
| DE | 20200512684 | 11/2005 |
| DE | 10 2007 049614 | 9/2008 |
| EP | 0058700 | 9/1982 |
| EP | 0069738 | 1/1983 |
| EP | 0179538 | 4/1986 |
| EP | 0320510 | 6/1989 |
| EP | 0442858 | 8/1991 |
| EP | 0599301 | 6/1994 |
| EP | 0864371 | 9/1998 |
| EP | 0893356 | 1/1999 |
| EP | 0908395 | 4/1999 |
| EP | 0930102 | 7/1999 |
| EP | 1084669 | 3/2001 |
| EP | 0954485 | 1/2002 |
| EP | 1327478 | 7/2003 |
| EP | 1637232 | 3/2006 |
| FR | 1266391 | 7/1961 |

| | | |
|---|---|---|
| FR | 2127774 | 10/1972 |
| FR | 2510069 | 1/1983 |
| FR | 2654079 | 11/1989 |
| FR | 2783667 | 3/2000 |
| FR | 2838108 | 10/2003 |
| GB | 1405546 | 8/1972 |
| GB | 1523732 | 9/1978 |
| GB | 2083142 | 3/1982 |
| GB | 2105729 | 3/1983 |
| GB | 2150226 | 6/1985 |
| GB | 2155435 | 9/1985 |
| GB | 2161222 | 1/1986 |
| JP | 07251884 | 3/1995 |
| JP | 09039467 | 2/1997 |
| WO | WO 96/16746 | 6/1996 |
| WO | WO 00/26007 | 5/2000 |
| WO | WO 00/44505 | 8/2000 |
| WO | WO 01/25116 | 4/2001 |
| WO | WO 02/48004 | 6/2002 |
| WO | WO 02/079679 | 10/2002 |
| WO | WO 2004/022143 | 3/2004 |
| WO | WO 2004/073871 | 9/2004 |
| WO | WO 2004/073877 | 9/2004 |
| WO | WO 2005/000731 | 1/2005 |
| WO | WO 2005/123542 | 12/2005 |
| WO | WO 2005/123543 | 12/2005 |
| WO | WO 2006/123168 | 11/2006 |
| WO | WO 2006/128574 | 12/2006 |
| WO | WO 2007/062824 | 6/2007 |
| WO | WO 2007/104561 A2 | 9/2007 |
| WO | WO 2009/030393 | 3/2009 |

OTHER PUBLICATIONS

U.S. Appl. No. 12/600,219, filed Mar. 13, 2010, Canfield et al.
U.S. Appl. No. 12/675,204, filed Apr. 29, 2010, Sonntag.
U.S. Appl. No. 12/675,229, filed Apr. 27, 2010, Bernhard.
Wacker Silicones, Geniomer® 200 Thermoplastic Silicone Elastomer, Jan. 10, 2005, XP002394023, retrieved from Internet address http://www.wacker.com/internet/webcache/en_US?PTM?TM?GENIOMER/GENIOMER_200_e.pdf on Aug. 8, 2006.
U.S. Appl. No. 13/529,109, filed Jun. 21, 2012, Canfield.

* cited by examiner

DISPENSING DEVICE

CROSS REFERENCE TO RELATED APPLICATIONS

This application claims the benefit under 35 U.S.C. 111(a) to German Application No. DE 102008029006.8 filed Jun. 20, 2008, the entire disclosure of which is incorporated herein by reference in its entirety.

SUMMARY OF THE INVENTION

The present invention relates to a dispensing device for a preferably cosmetic liquid as well as to a method for the manufacture of such a device.

In the present invention, the term "dispensing device" is to be particularly understood as a dispensing head which is preferably mounted or is mountable on a container or its dispensing valve or on a hand-operated pump. In particular, it can also be a pressurized container, a dispenser pump or the like. The dispensing device is preferably used for the non-spraying delivery or dispensing of a preferably cosmetic liquid. However, it can also be a dosing pump or hand-operated pump or any other dispensing device such as a container, spray head, dispenser or the like, particularly for a cosmetic liquid The term "liquid" is also to be understood particularly as suspensions and fluids, optionally with gas phases. The liquid can be output as a paste, stream or mist or in another manner, for example as a foam or gel.

Preferably, the dispensing device is used for a cosmetic liquid. The term "cosmetic liquid" is to be understood, in a narrower sense, as cosmetics, hair spray, hair lacquer, deodorant, shaving foam, color spray, sun protection or skin care agent—in general, agents for beauty care or the like. Preferably, however, other body or hair care products are also included in a broader sense.

For example, the liquid can also be a cleaning agent or lubricant or other liquids, for example air fresheners and, in particular, other technical liquids and fluids as well such as rust removers or the like. Nonetheless, for the sake of simplicity and due to the emphasized use, the following will often just speak of a cosmetic liquid.

In today's dispensing devices for the dispensing of, particularly, foaming or foamed liquids such as shaving foam, or in dispensing pumps, there is often the problem that the liquids or the products formed from them will come out after the actual dispensing is finished, in particular foaming or dripping out afterwards. This problem is particularly blatant in shaving foam or the like but also occurs in non-foamed or non-foaming liquids and can lead, in particular, to undesired contaminations of the dispensing devices.

WO 2007/104561 A2 discloses a dispensing device. According to one embodiment, the dispensing device is designed as a spray head with an outlet valve to prevent the subsequent escape of liquid or foam. The outlet valve has an elastically deformable, flat valve element which seals a dispensing opening. The valve element can be pretensioned into its closed position by an additional stop. The valve element is preferably injection-molded against a base material that is pretreated in areas and thus joined with the base material in the pretreated area. The pretreatment is performed through plasma treatment and/or irradiation in order to be able to join two materials in the desired area which would not be able to be joined to each other otherwise. In practice, it has turned out that it is very difficult to create a tight connection of the valve element with the base material.

The object of the present invention is to provide an improved dispensing device and a method for the manufacture thereof, so that optimal combinations of material and/or a lasting and/or tight joining of materials is or are made possible particularly only in desired areas with a simple, cost-effective construction.

This object is achieved by means of a dispensing device according to claim 1 or a method according to claim 17. Advantageous modifications are the subject of the subclaims.

One aspect of the present invention consists in that, in the dispensing device, a first material is pretreated in an area and, subsequently, a second material is injection-molded directly against the first material in an area and is thus solidly joined with the first material, with the two materials not being joined in the pretreated area and/or preferably being detachable from each other exclusively in the pretreated area. In this way, a detachment of the two materials from each other in the pretreated area and hence, in particular, the formation of an outlet channel can be made possible in a very simple manner.

The pretreatment is performed particularly through the application of a coating, intermediate layer or film, especially preferably of an embossing foil or heat-seal film which is particularly solidly joined with the first material and/or not joined or joinable with the second material. This allows for very simple, cost-effective and/or speedy manufacture.

The proposed solution allows for optimal pairing of materials. In particular, materials can also be used which join solidly with each other in order to form components which are able to detach partially from each other.

BRIEF DESCRIPTION OF THE DRAWINGS

Further advantages, features, characteristics and aspects of the present invention follow from the claims and the following description of preferred embodiments on the basis of the drawing.

DETAILED DESCRIPTION OF THE INVENTION

In the partially not-to-scale, only schematic figures, the same reference symbols are used for same or similar parts, with corresponding or comparable characteristics and advantages being achieved even if a repeated description has been omitted.

Figure 1:
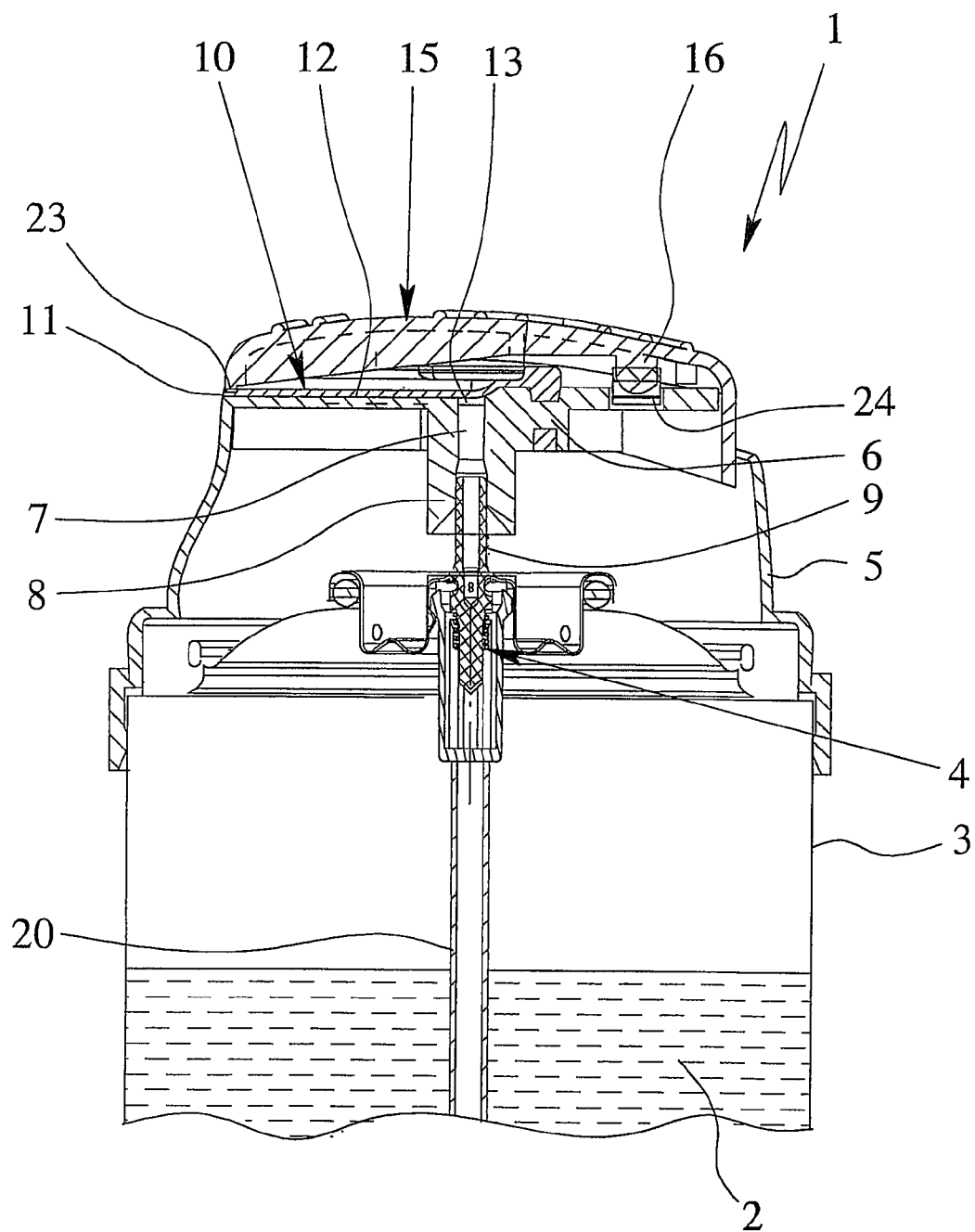
FIG. 1 shows a schematic section of a proposed dispensing device with a container according to a first embodiment.

FIG. 1 shows in schematic section a first embodiment of a proposed dispensing device 1 which is preferably embodied as a dispensing head for the dispensing of a liquid 2 in the sense named at the outset.

The liquid 2 can be substantially more viscous than water or optionally even pasty. In particular, it can form a foam or gel. The liquid 2 can also contain gas in liquid and/or another form.

Particularly, the dispensing device 1 is designed for the non-spraying dispensing of the liquid 2. In particular, a delivery of the liquid 2 occurs as foam, preferably as shaving foam or the like. For this purpose, the liquid 2 is particularly designed to be self-foaming and/or is foamed up upon dispensing.

However, in principle, the liquid 2 can also be dispensed in the non-foamed state and, particularly, can also be non-foaming. Moreover, it is also possible for the liquid 2 to foam up only slightly, so that the foaming merely enlarges the volume somewhat, for example, while a liquid or pasty consistency is essentially maintained during dispensing.

In should be noted that, instead of the delivery of the liquid 2 as foam explained for the sake of example, any other delivery of the liquid 2—optionally even as a pasty mass, as gel, as drops, as a stream or as a spray mist—is possible.

The dispensing device 1 is preferably provided with or connected to a reservoir, particularly a container 3, for the liquid 2 to be delivered. The reservoir can therefore form a part of the dispensing device 1 or can be connected thereto.

In the depicted example, the reservoir is embodied as a preferably rigid container 3, particularly as a pressurized container. The container 3 for the liquid 2 is particularly oblong and/or cylindrical and/or rigid and is especially preferable embodied as a metallic can.

The liquid 2 in the reservoir can either be placed under pressure or is under pressure. In particular, the container 3 or the liquid 2 contains a suitable propellant, preferably a volatile and/or combustible propellant, compressed gas and/or carbon dioxide.

Especially preferably, the container 3 has a dispensing valve 4 on the front to which the dispensing device 1 or the dispensing head formed by same is connected or can be connected.

In the depicted example, the dispensing device 1 preferably has a housing part 5 which is or can be connected with the reservoir or container 3, and especially preferably can be placed in a clamping and/or locking manner onto it.

Moreover, the dispensing device 1 has a component 6 which is preferably placed into the housing part 5 and/or is held or formed thereby, with said component 6 forming a conveyor channel 7 and being connectable or connected to the dispensing valve 4. In the depicted example, the component 6 is provided with a corresponding connecting section 8 particularly for a pluggable connection with the dispensing valve or a connection element 9 of the dispensing valve 4.

In the first embodiment, the housing part 5 and the component 6 are preferably embodied in a single piece, particularly with the housing part 5 maintaining the component 6 tiltable or depressible.

In the depicted example, the dispensing device 1 has an outlet valve 10 which is particularly associated with the conveyor channel 7 and/or a dispensing end 11 of the dispensing device 1.

Especially preferably, the outlet valve 10 has a valve element 12 which can be elastically deformed at least in part for the opening and closing of the outlet valve 10.

Especially preferably, no nozzle and no other channel or the like is connected to the outlet valve 10 or its valve element 12 or to the dispensing end 11. Rather, these preferably open "to the open air." In this way, the liquid 2 can be removed and used by a user (not shown) preferably immediately after exiting the outlet valve 10. In the depicted example, the valve element 12 covers a dispensing opening 13 of the conveyor channel 7 and/or extends to the dispensing end 11 or forms same.

The dispensing opening 13 of the channel preferably ends in the wall 14 of the component 6 or conveyor channel 7, which is or can be covered by valve element 12 at least in the area of the dispensing opening 13. Preferably, the wall 14 is formed by the housing part 5 or component 6.

The outlet valve 10 is preferably embodied such that it opens in a manner dependent on the pressure in place, particularly upon exceeding a predetermined minimum pressure. Especially preferably, this minimum pressure is greater than a foaming pressure of the preferably self-foaming liquid 2. By contrast, the dispensing pressure (with opened dispensing valve 4) and hence the liquid pressure in place is in turn greater than the minimum pressure, so that the outlet valve 10 also opens for the desired dispensing of liquid and production or dispensing of foam.

The component 6 or housing part 5 preferably forms an area or section which is preferably pliable in the manner of a spring, for example tiltable and/or tongue-like, so that it can be displaced with the connecting section 8 toward the dispensing valve 4, hence making it possible to open the dispensing valve 4.

Furthermore, the dispensing device 1 preferably has an actuation element 15 which is embodied in the depicted example as a separate part. However, other constructive solutions are also possible.

The opening of the dispensing valve 4 is preferably performed by depressing and/or tilting the abovementioned springy and flexible area or component 6 or the connecting section 8 or the actuation element 15. For example, the actuation element 15 can act for this purpose on the component 6 via an actuation section 16.

Figure 2:
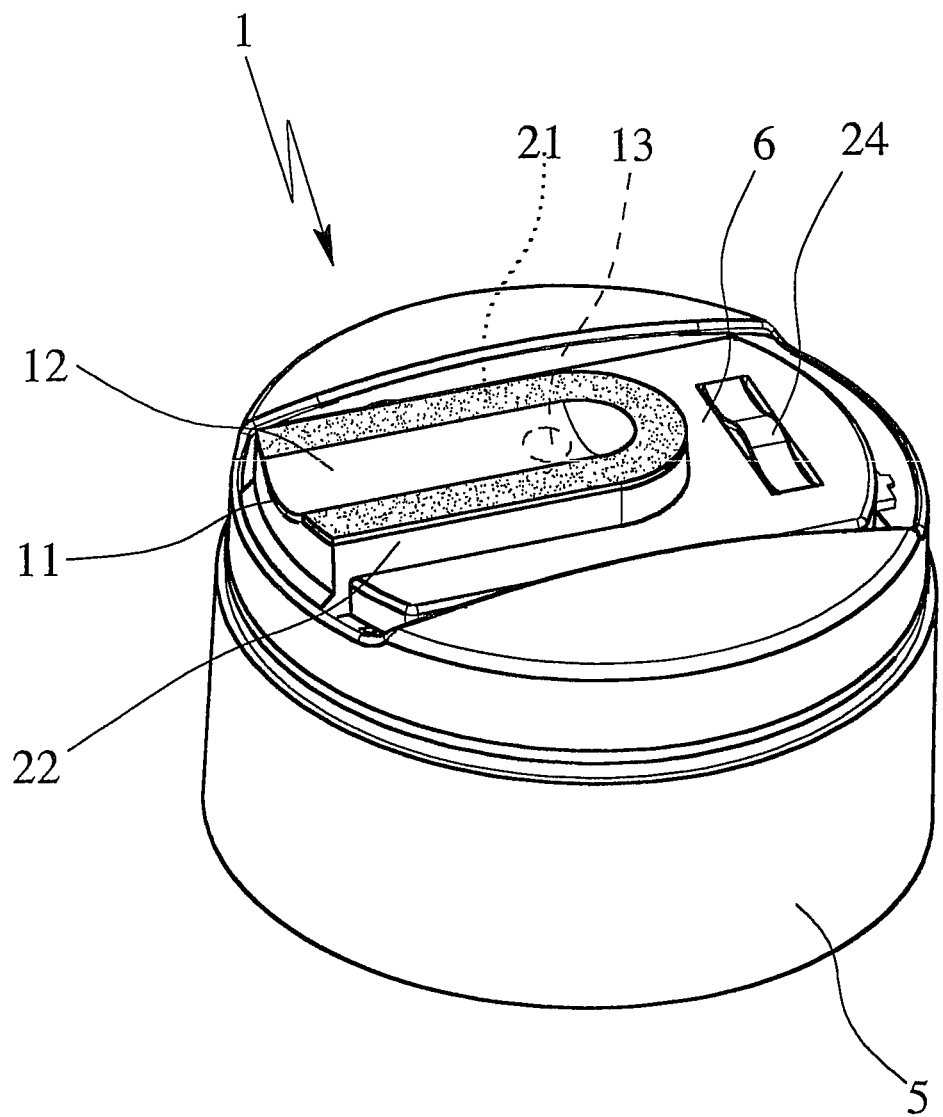
FIG. 2 shows a perspective view of a housing part of the dispensing device.
Figure 3:
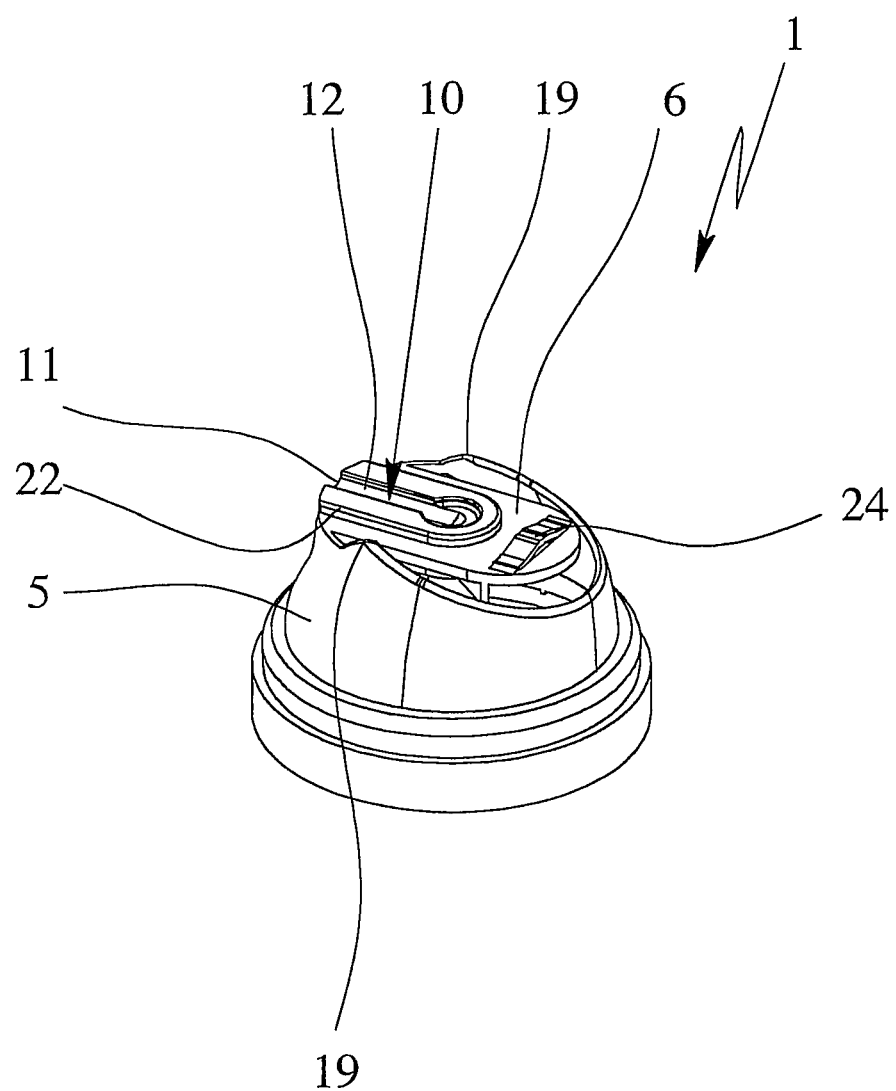
FIG. 3 shows another perspective view of the somewhat modified housing part of the dispensing device.
Figure 4:
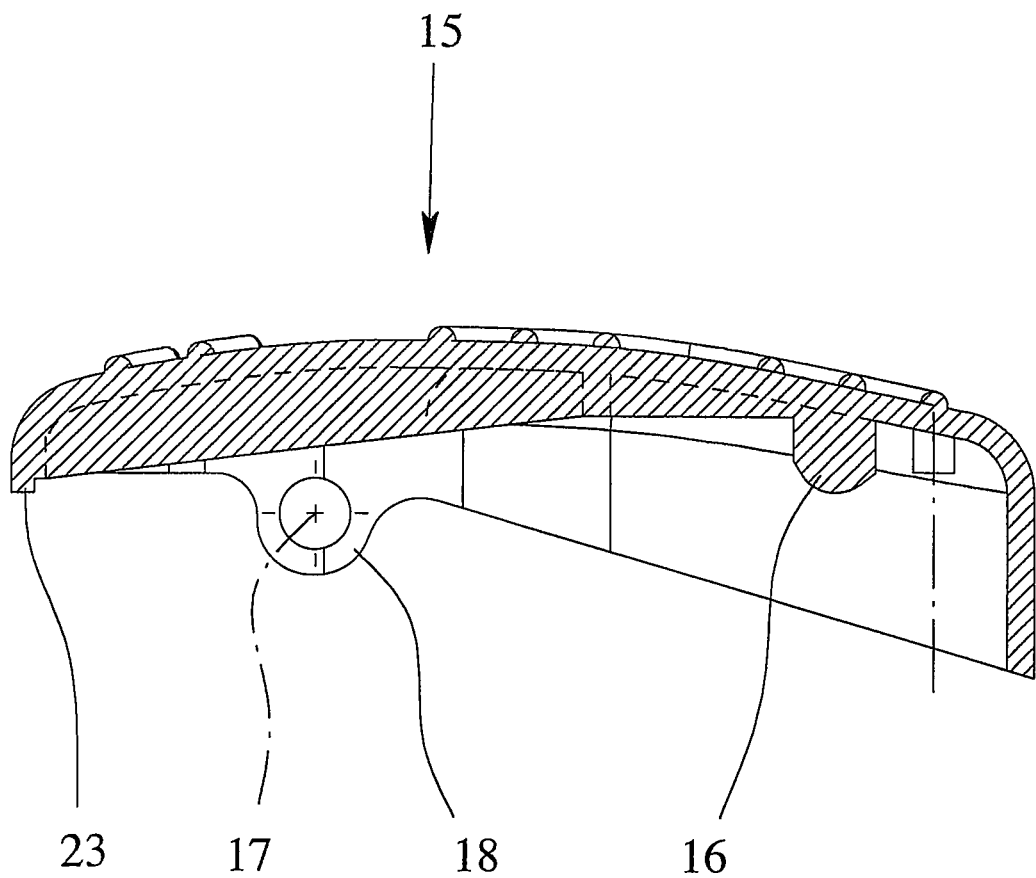
FIG. 4 shows a schematic section of the actuation element of the dispensing device.

In the depicted example, the actuation element 15 is can preferably be swiveled or tilted. FIG. 2 shows, in a perspective view, the housing part 5 of the dispensing device 1. In another perspective representation, FIG. 3 shows a variation of the housing part 5. FIG. 4 shows, in an enlarged, schematic section, the actuation element 15 without other components of the dispensing device 1.

In the depicted example, the actuation element 15 can be swiveled about a swivel axis 17. For this purpose, the actuation element 15 is provided, for example, with bearing sections or bearing lugs 18 which can be mounted, for example, using retention sections 19 of the housing part 4 [sic] as indicated in FIG. 3. In the variation according to FIG. 2, these retention sections are not provided. Instead, another constructive solution for the tilt mounting of the actuation element 15 is then provided (not shown in further detail).

Preferably, the swivel axis 17 lies substantially between the connection element 9, the conveyor channel 7 or the dispensing opening 13 on the one hand and the dispensing end 11 (outlet) on the other hand.

By depressing the actuation element 15 (on the right side in FIGS. 1 and 4), the component 6 is displaced accordingly with the connecting section 8 downwards or toward the dispensing valve 4 in order to open same through actuation of the connection element 9 or in some other appropriate manner.

With opened dispensing valve 4, the liquid 2 preferably under pressure in the reservoir or container 3 can then flow via a riser tube 20 (FIG. 1) and the opened dispensing valve 4 into the conveyor channel 7. In particular, an at least initial foaming of a foaming of the liquid 2 then occurs in the conveyor channel 7. As needed, a foaming device (not shown) can also be provided (in addition or alternatively). For example, the liquid 2 or the foam can be fed through a screen (not shown) and/or be foamed (in addition or alternatively) through the feeding of gas.

As a result of the liquid pressure or dispensing pressure present in the conveyor channel 7 when the dispensing valve 4 is open, the outlet valve 10 preferably opens automatically.

Given appropriate liquid pressure, the outlet valve 10 opens as a result of the valve element 12 lifting off at least in part from the component 6 or the wall 14.

Especially preferably, the valve element 12 is solidly and/or tightly joined with the surface of the component 6 or the wall 14—particularly in an edge area and/or U-shaped area—at least or only in a connection area 21 (FIG. 2).

In the first embodiment, the dispensing opening 13 or the conveyor channel 7 ends in a trough-like or groove-like or concave surface of the wall 14. Particularly, the dispensing opening 13 opens in the area of the end opposing the dispensing end 11 of an oblong recess formed by the component 6 or the wall 14 which is enclosed particularly by a preferably U-shaped, particularly raised edge 22 and/or the connection area 21. The edge 22 extends with its two preferably parallel legs in the dispensing direction, which is to say toward the dispensing end 11.

The valve element 12 is preferably solidly and tightly held and/or joined with the component 6 at least in the area of the edge 22, as indicated schematically by the connection area 21 in FIG. 2.

In the area from the dispensing opening 13 to the dispensing end 11, the valve element 12 is not joined with the wall 14 but rather is able to lift off given the presence of appropriate liquid pressure particularly through elastic deformation, particularly arching upwards, and to form or release a channel-like connection (virtual outlet channel) in the area therebetween, here between the conveyor channel 7 or the dispensing opening 13 thereof and the dispensing end 11 or another outlet. As a result, the outlet valve 10 or this part opens.

The liquid 2 can escape to the outside or into the open through the opened outlet valve 10 and, especially preferably, foam up or continue to foam up or form a gel or another product or be dispensed in liquid, pasty or another form.

The dispensing valve 4 closes again preferably automatically upon release of the actuation element 15. In the depicted example, the return of the component 6 or of the connecting section 8 preferably occurs exclusively through spring forces of the elastic section.

In addition or alternatively, however, a return or closing spring or another constructive solution that is not shown can also be used.

As needed, the dispensing valve 4 can also be, for example, a dosing valve or another valve arrangement.

The dispensing of liquid or production of foam ends when the liquid pressure or dispensing pressure present in the conveyor channel 7 again falls below the minimum pressure, so that the outlet valve 10 closes again—particularly through the elastic return to position of the valve element 12. This is the case when the dispensing valve 4 closes again—particularly through the release or automatic return to position of the dispensing head or actuation element 15- and the pressure in the conveyor channel 7 drops below the minimum pressure. The closed or closing outlet valve 10 then prevents the liquid 2 or foam or the like still present in the channel 7 from subsequently coming out or foaming out in an undesired manner.

Preferably, a more or less "virtual" outlet channel is formed between two components lying flat upon each other, here namely the component 6 and the valve element 12, which opens only given the appropriate liquid pressure and closes again automatically and, particularly, performs a valve function and/or is able to very effectively prevent the undesired subsequent flowing or subsequent flowing.

A special advantage of the outlet valve 10 consists in that, in addition to preventing a subsequent escape of the liquid 2, particularly a subsequent foaming, very easy cleaning is also made possible for the user, since the outlet valve 10 preferably forms a clean and easy-to-clean dispensing end 11.

In the depicted example, the dispensing of the liquid preferably occurs substantially crossways, particularly perpendicularly, to the direction of depression or opening of the dispensing valve 4 and/or at least substantially horizontal or crossways to the longitudinal direction of the container 3.

Preferably, the valve element 12 extends to the dispensing end 11 and/or forms same, particularly together with the component 6 or the wall 14.

Moreover, it bears mentioning that, preferably, no other device shaping the liquid output such as a nozzle, a channel or the like is connected to the dispensing end 11. However, this does not rule out the provision of, for example, a bowl-like extension, a recess in the housing or the like into which the dispensing end 11 empties.

According to another aspect, the outlet valve 10 or the valve element 12 thereof is (additionally) pressed or pretensioned into the closed position with non-actuated dispensing device 1 or closed dispensing valve 4 through a stop 23—here particularly against the wall 14 and/or in the area of the dispensing end 11. In the depicted example, the stop 23 is preferably bridge- or rib-like and/or arranged on the actuation element 15, particularly formed thereon.

In the closed state shown, the actuation element 15 is located in the non-tilted or upper position (initial position), so that the stop 23 presses directly on the valve element 12, thus holding the outlet valve 10 (additionally) closed as shown in FIG. 1.

The actuation element 15 can preferably be swiveled or tilted about the swivel axis 17 preferably running horizontally or, in the representation according to FIGS. 1 and 4, perpendicular to the drawing plane. The swivel axis 17 preferably lies between and/or approximately on the plane between the stop 23 on the one hand and the actuation section 16 acting on the component 6 on the other hand. Accordingly, upon actuation or depression of the actuation element 15 from the position shown in FIG. 1, the actuation section 16 is moved downwards and the stop 23 is moved upwards or in the opposite direction. Accordingly, the outlet valve 10 can open unimpeded even if the component 6 or the outlet valve 10 is not moved or is moved only relatively slightly downwards or away from the stop 23 when the dispensing device 1 is actuated.

Especially preferably, the stop 23 or the actuation element 15 is pretensioned into its initial position or the closure position closing the outlet valve 10. In the depicted example, a spring section 24 is provided for this purpose which is particularly formed on the component 6 in a single piece or formed by same. However, other constructive solutions are also possible.

The restorative force exerted by the spring section 24 or another device on the actuation element 15 is preferably less than the force required for the depression of the component 6 or connecting section 8 and particularly the force required for the opening of the dispensing valve 4. In this manner, it can be achieved that the stop 23 is first moved away from the valve element 12 or that the force it exerts on the valve element 12 is reduced before the dispensing valve 4 opens.

In the depicted example, the actuation element 15 is preferably embodied as a separate piece which is particularly placed, stuck, clamped or snapped on, particularly pivotably mounted or held on the retaining sections 19 (FIG. 3).

Preferably, the actuation element 15 with its bearing sections or bearing lugs 18 is mounted or supported on both sides of the outlet valve 10 or valve element 12 and/or can be or is snapped onto the retaining sections 19.

However, other constructive solutions are also possible. In particular, the actuation element 15 can also be mounted in another manner, elastically deformable and/or formed onto the housing part 5 or component 6.

In the following, further embodiments of the proposed dispensing device 1 are explained on the basis of the other figures, with the following description being limited to substantial differences or new aspects. The foregoing remarks and explanations apply particularly correspondingly or by augmentation.

Figure 5:
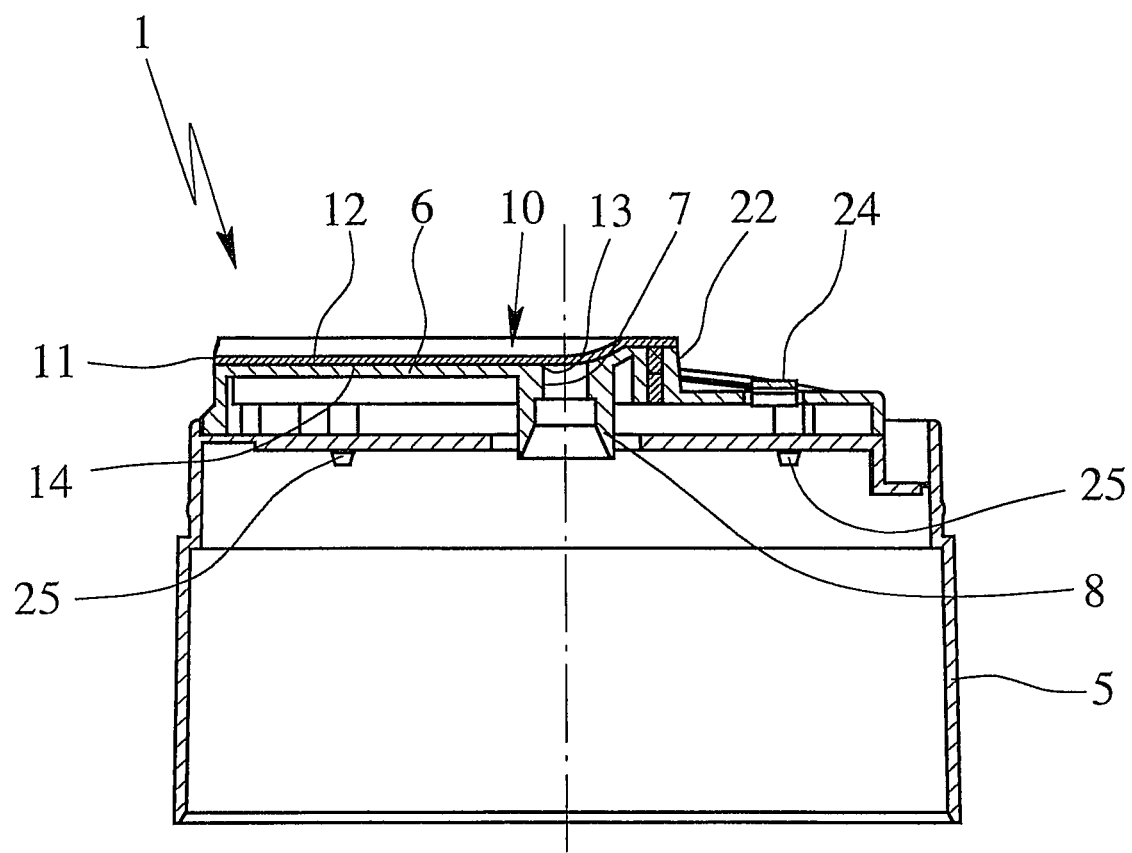
FIG. 5 shows a schematic section of a housing part of the proposed dispensing device according to a second embodiment.

FIG. 5 shows, in a schematic section, a second embodiment of the proposed dispensing device 1, with the associated container 3 with the dispensing valve 4 not being shown for the sake of simplicity.

In the second embodiment, the component 6 is not embodied in a single piece with the housing part 5, but rather as a separate component.

The component 6 is preferably joined in a non-detachable, locking and/or clamping manner with the housing part 5, here particularly a tongue- or plate-like section of the housing part 5 which can preferably be depressed or swiveled in order to be able to actuate or open the associated dispensing valve 4 (not shown in FIG. 5). To join the component 6 with the housing part 5, connection means 25 are preferably provided in the depicted example which can be arranged, applied or formed on the housing part 5 and/or component 6 and connected with the respective other part. However, other constructive solutions are also possible.

Figure 6:
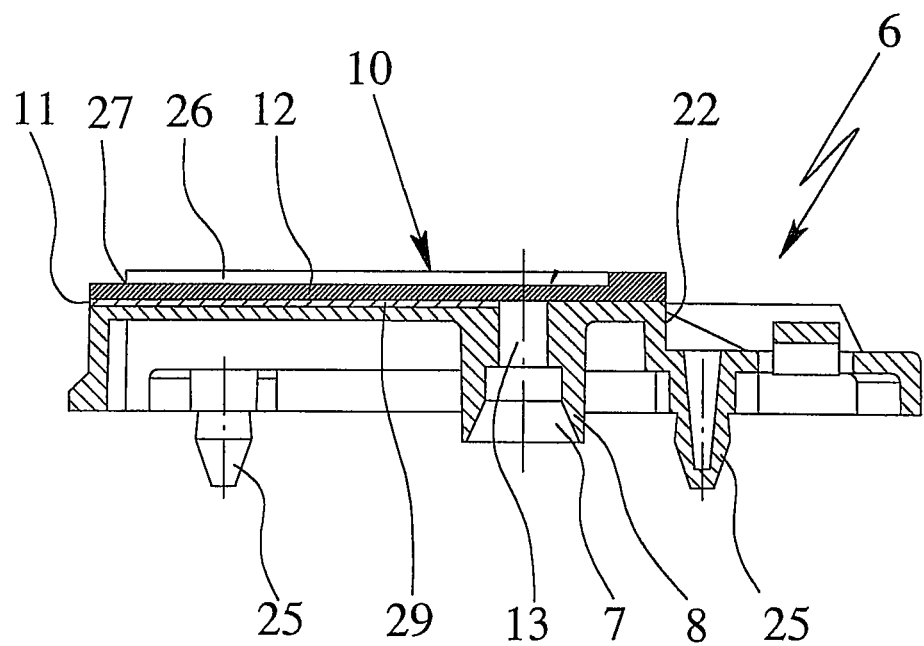
FIG. 6 shows a schematic section of a component of the dispensing device according to a third embodiment.
Figure 7:
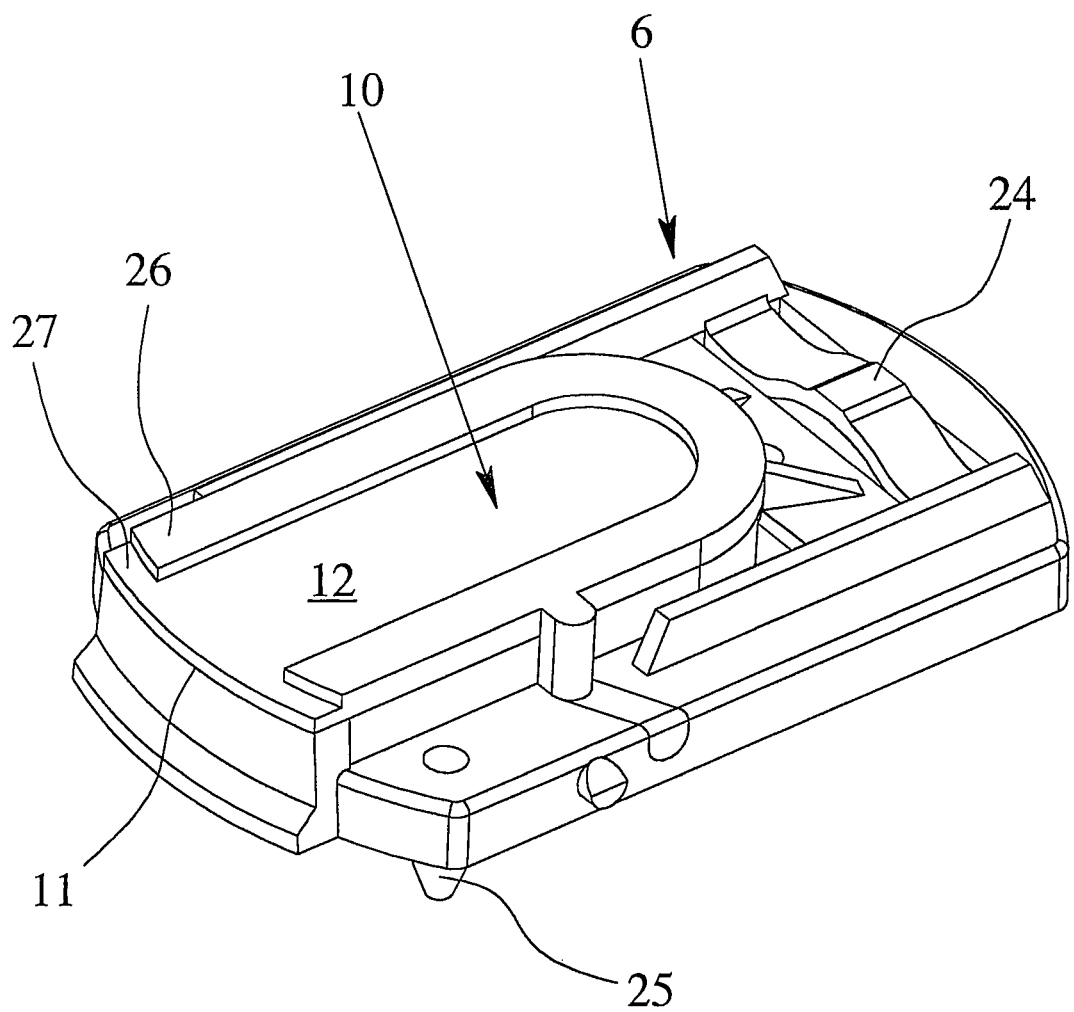
FIG. 7 shows a perspective view of the component.
Figure 8:
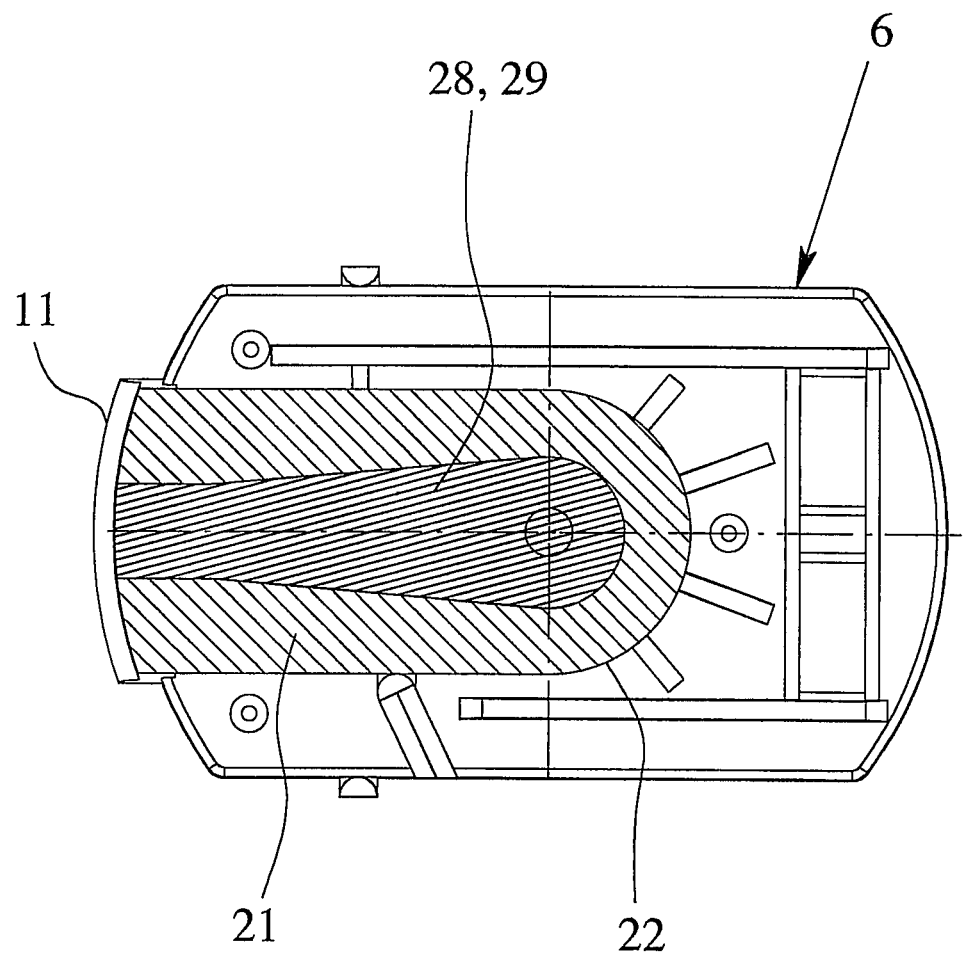
FIG. 8 shows a horizontal section of the component.

FIGS. 6 to 8 show a third embodiment of the proposed dispensing device 1, but only the component 6 with the outlet valve 10 for the sake of simplicity. FIG. 6 shows a schematic vertical section. FIG. 7 shows a perspective view. FIG. 8 shows a schematic horizontal section.

In the third embodiment, the wall 14 and/or the valve element 12 is/are at least substantially flat at least in the area lying flat against each other or valve area. However, other constructive shapes or arrangements are also possible, for example a design that is convex at least in areas or an annular or cylindrical design of the valve element 12 and a complementary design of the wall 14 or vice-versa.

In the third embodiment, the valve element 12 is optionally provided with an edge reinforcement 26. The edge reinforcement 26 can run, for example, along the edge 22 of the wall 14 and/or substantially above or along the connection area 21.

Preferably, the valve element 12 is as uniformly thick as possible, and preferably relatively thin, in the area of the dispensing end 11 in order to make it possible for the preferably bridge-like stop 23 to seat uniformly in the closed position. If the edge reinforcement 26 is provided, then it preferably has a relief or recess 27 in the area of the dispensing end 11 as indicated in FIGS. 6 and 7. However, other constructive solutions are also possible.

It should be noted that the stop 23 preferably extends over the entire width of the valve element 12 or of the dispensing end 11. However, other constructive solutions are also possible.

Especially preferably, the wall 14, the valve element 12 and the stop 23 end at least substantially on the same plane or surface when the outlet valve 10 is closed. This is conducive to a clean and/or well-sealing closure or outlet.

The following embodiments relate particularly to all of the embodiments and variations shown as well as to the invention in general.

The housing part 5 and/or component 6 is or are preferably injection-molded or manufactured from plastic.

The component 6 is manufactured from a first material, particularly a relatively rigid plastic material. A polyolefin, particularly PP (polypropylene) or PE (polyethylene), is preferably used.

The valve element 12, which is also generally referred to in the present invention as the second component, is manufactured from a second material and/or injection. In particular, the second material is an elastomer and/or a thermoplast. Preferably, TPE (thermoplastic elastomer) or TPV or the like is used. Particularly, this is a flexible material. The second material is particularly flexible or softer than the first material. This is particularly desirable in the embodiments shown, since the valve element 12 formed from it should have a certain elastic deformability and/or flexibility in contrast to the wall 14 formed by the component 6.

Accordingly, the first material and the second material are preferably different, i.e. they differ from each other particularly with respect to their composition and/or characteristics. However, other constructions are also possible in principle in which the same or identical material can be used for the first material and the second material.

Preferably, a coupling of materials is selected for the first material and the second material which is such that the two materials can preferably be joined solidly together through injection-molding. Especially preferably, such a solid joining of the two materials can be achieved without pretreatment, coupling agent, processing or the like.

Especially preferably, the injection-molding is performed by means of so-called "bi-injection," in which one material (the first material) is first injected into an injection mold and then the other material (the second material) is injected particularly in the same mold against the previously injected material. However, it is also possible in principle for the two materials to be injected basically almost simultaneously into the same mold.

Through the injection of the two materials against each other, the desired solid connection in the connection area 21 is achieved. Preferably, no other measures are required for the joining of the two materials or components (here the component 6 and the valve element 12) in the desired connection area 21 in order to achieve the desired strength, chemical bond, chemical resistance and/or tightness. However, supplementary or alternatively other measures can also be used in principle, such as pressing, clamping, welding or the like.

According to one aspect of the present invention, the first material (here the wall 14 of the component 6) is pretreated in an area 28 which is depicted schematically in FIG. 8 in order to prevent the two materials and hence the two components from joining together. In the embodiments described, it is therefore achieved that the valve element 12 forming the second component does not join with the first component 6 in the pretreated area 28 or is able to detach from the first component 6 exclusively or at least in the pretreated area 28. In this manner, it is possible according to the proposal for the second component (valve element 12), which is injection-molded directly against the first component 6 (or glued, alternatively) and thus solidly joined therewith, does not bond therewith in the pretreated area 27 and/or can be detached again from it preferably exclusively in the pretreated area 28.

The proposed pretreatment can also be understood as a kind of passivation or introduction of an interlayer which prevents a joining of the first and second material or of the two components 6, 12 in the pretreated area 28.

Preferably, the first material or component 6 is pretreated through the application of a coating, intermediate layer or film 29 as indicated in the schematic section according to FIG. 6 and in the top view according to FIG. 8. In particular, an embossing foil or heat-seal film is used which covers the first material or component 6 in the desired area 28 and/or is joined with the first material or component 6 at least in areas particularly through pressure and/or heat.

Depending on the procedure, the joining with the film 29 or another covering with the first material or component 6 can be achieved and/or promoted directly in the injection mold and/or due to the residual heat present after injection and/or through additional and targeted thermal action (e.g. infrared radiation) and/or pressure.

Alternatively, however, it is also possible in principle to adhere the covering or film 29 only lightly in the area 28 to be pretreated or even to leave it lying loosely thereupon.

As needed, the covering or film 29 can also be positioned by means of retaining bridges (not shown) or the like in the desired manner on the wall 14 or the first material or component 6 and optionally also held or fixed during injection of the second material or component (valve element 12).

Especially preferably, the coating, intermediate layer or film 29 is composed of an additional material and/or of different materials in order to achieve a joining with the first material or component 6 and/or to prevent a joining with the second material or component (valve element 12).

As needed, the coating or intermediate layer can also be applied through pressing, adhesion or in another manner.

If the coating in the pretreatment area 28 consists of or is formed from paint or another liquid, it can be applied in any manner in the area 28 to be pretreated in terms of the present invention.

Subsequently, the second material or component (valve element 12) is preferably injection-molded directly against the first material or component 6 and thus joined therewith. In principle, another connection is may be considered, for example through adhesion, welding or the like. Preferably, the pretreated area 28 is completely covered or enclosed by the second material, with the exception of an inlet and/or outlet, if provided. The covering or film 29 is opened in the area of the dispensing opening 13 preferably mechanically, during manufacture and/or by the liquid 2 upon the first dispensing. As a result of the proposed pretreatment in the area 28, it is achieved that precisely no connection or (solid) adhesion occurs of the second material or component (valve element 12) on the first material or component 6 or on the coating, intermediate layer or film 29. Rather, the second material or component (valve element 12) is able to lift off or detach, preferably exclusively or at least in the pretreated area 28.

In the depicted example, the pretreatment area 28 is preferably strip-like and extends from the dispensing opening 13 to the dispensing end 11. However, other constructive solutions are also possible.

Especially preferably, a blank is first injection-molded from the first material. Subsequently, a film 29 is embossed—particularly using a heat-embossing technique—in the desired pretreatment area 28 which is to later undergo no connection with a soft component. Then, the soft component is injection-molded onto the first component or hard component, particularly such that the coating, intermediate layer or film 29 is also cast at least substantially completely. Instead of the preferred heat-embossing technique, an imprinting or inlaying of a suitable intermediate element such as an intermediate layer or film 29 can also be performed for the desired pretreatment in the area 28.

In particular, in is also possible and provided for that the second material be injection-molded or applied in another manner over its full surface against the first material or the surface or wall 14 formed by same. Due to the pretreatment being only in areas, adhesion or a connection then preferably only occurs outside the pretreated area 28. The second component or valve element 12 is thus able to detach again, for example lift off or the like, from the first material in the pretreated area 28, particularly in order to form a channel for the liquid 2 or a product formed from same such as a foam, or a valve, an outlet channel or the like. In this way, very simple manufacture and the establishment of desired connection areas 21 are made possible.

It should be noted as a matter of principle that, in the present invention, the term "solid" connection is to be understood preferably in terms of a chemical and/or tight connection.

It should be noted that the proposed manufacture described above can also be used in other components of a dispensing device 1, which is to say, in particular, not only in valve components or the like.

In all embodiments and according to a preferred aspect, the valve element 12 is preferably seated uniformly and over its entire surface on the component 6 or the wall 14 thereof—particularly along the "virtual" dispensing channel as well—starting from the dispensing opening 13 toward the dispensing end 11.

Only upon dispensing of liquid is the valve element 12 lifted off elastically along this virtual outlet channel from the component 6 or the wall 14 (this is possible since the second material 16 does not join solidly with first material 15 of the component 6 as a result of the aforementioned pretreatment) and, as a result, the outlet channel is released or opened.

After the dispensing of liquid is concluded, the outlet valve 10 or valve element 12 preferably closes again automatically as a result of the elastic restorative forces.

Especially preferably, the stop 23 on the one hand and the conveyor channel 7 or the dispensing opening 13 thereof on the other hand are spaced apart from each other and, particularly, arranged at opposing end areas of the "virtual outlet channel" formed by the valve element 12 when the outlet valve 10 is open.

In particular, the stop 23 is used to close the outlet valve 10 in an area of the valve element 12 which is spaced apart from the dispensing opening 13 such that the valve element 12 is able to close independently of the stop 23, particularly as a result of appropriate elastic restorative forces. This results, particularly, in a kind of double valve or an especially good sealing or closing effect.

In all embodiments, the stop 23 acts also or substantially as a closing or return element associated with the outlet valve 10 or valve element 12. Accordingly, the term "stop" is to be understood generally in this sense as well.

The various embodiments and individual features and constructive solutions of the embodiments can also be combined with each other as desired but can also be used independently of each other or of the proposed pretreatment and/or in other dispensing devices.

LIST OF REFERENCE SYMBOLS

1 Dispensing device
2 Liquid
3 Container
4 Dispensing valve
5 Housing part
6 Component
7 Conveying channel
8 Connecting section 9 Connection element
10 Outlet valve
11 Dispensing end
12 Valve element
13 Dispensing opening
14 Wall
15 Actuation element
16 Actuation section
17 Swivel axis
18 Bearing lug
19 Retention section
20 Riser tube
21 Connection area
22 Edge
23 Stop
24 Spring section
25 Connection means
26 Edge reinforcement
27 Recess
28 Area of pretreatment
29 Film

The invention claimed is:

1. A method for manufacture of a dispensing device for a liquid, wherein a first material is pretreated at least in areas and wherein a second material is injection-molded directly against the pretreated first material and thus chemically or solidly joined therewith, with the two materials not being joined together in a pretreated area or being detachable from each other in said pretreated area as a result of a pretreatment, wherein the first material is pretreated through an application of a coating, an intermediate layer or a film, and wherein a first component is first injection molded from the first material, wherein the coating or the film is subsequently applied in a desired pretreatment area and wherein, finally, the second material is injection-molded over the coating or the film such that a second component is formed from the second material which is able to detach again from the first component or the coating or the film in the pretreated area and does not lift-off or detach in an area directly covering the first material.

2. The method as set forth in claim 1, wherein the coating or the film is applied onto the first component through heat-embossing.

3. The method as set forth in claim 1, wherein the second material is an elastomer and/or a thermoplast.

4. The method as set forth in claim 1, wherein the first material is a polyolefin.

5. The method of claim 1, wherein the second component is a valve element.

6. The method of claim 1, wherein the coating, the intermediate layer or the film is solidly joined with the first component.

7. The method of claim 1, wherein the coating, intermediate layer or the film is not joined with the second component.

8. The method of claim 1, wherein the first and the second components are solidly joined with each other in a U-shaped area.

9. The method of claim 1, wherein the first component forms a surface or wall on which the second component seats flatly or with which the second component is joined.

10. The method of claim 1, wherein the liquid or a product formed from the liquid can be output from the pretreated area.

11. The method of claim 1, wherein the liquid or a product formed from the liquid can be output between the first and second components through corresponding elastic deformation of at least one component.

12. The method of claim 1, wherein an outlet channel for the liquid is formed or opened between the first and second components upon elastic deformation of at least one component.

13. The method of claim 1, wherein the first and second components form an outlet valve.

14. The method of claim 1, wherein the first and second components comprise different materials which can be joined together solidly, chemically or tightly through injection-molding.

15. The method of claim 1, wherein the dispensing device has or forms a dispensing head for the liquid or product formed therefrom from a container that is or can be pressurized.

16. The method of claim 1, wherein the liquid is a cosmetic liquid.

17. The method of claim 1, wherein the first and second two components are detachable from each other exclusively in the pretreated area.

18. The method of claim 12, wherein the outlet channel for the liquid is formed or opened only in the pretreated area.

19. The method of claim 1, wherein the liquid is or forms a foam or gel.

20. The method of claim 15, wherein the outlet channel for the liquid is formed or opened only in the pretreated area.

* * * * *